J. H. TRACY.
SYSTEM OF ELECTRICAL DISTRIBUTION.
APPLICATION FILED APR. 22, 1909.

978,514.

Patented Dec. 13, 1910.

WITNESSES:

INVENTOR
Joseph H. Tracy
BY
Augustus B Stoughton,
ATTORNEY.

UNITED STATES PATENT OFFICE.

JOSEPH H. TRACY, OF PHILADELPHIA, PENNSYLVANIA.

SYSTEM OF ELECTRICAL DISTRIBUTION.

978,514.     Specification of Letters Patent.     Patented Dec. 13, 1910.

Application filed April 22, 1909. Serial No. 491,530.

*To all whom it may concern:*

Be it known that I, JOSEPH H. TRACY, a citizen of the United States, and a resident of Philadelphia, in the county of Philadelphia and State of Pennsylvania, have invented a certain new and useful System of Electrical Distribution, of which the following is a specification.

This invention relates to the use of a storage battery for emergency purposes on a circuit which is subject to violent fluctuations in voltage.

The object of the invention is to secure simple and effective means for automatically throwing the entire load onto the storage battery and cutting out the source of the fluctuating voltage when the fluctuations exceed predetermined values. As an example of such a system, may be taken an exciter circuit supplying current to the fields of one or more generators the voltage of this circuit being varied automatically to maintain constant voltage on these generators.

The general nature of my invention will be more clearly understood by reference to the following description, taken in connection with the accompanying drawings, in which—

Figure 1:
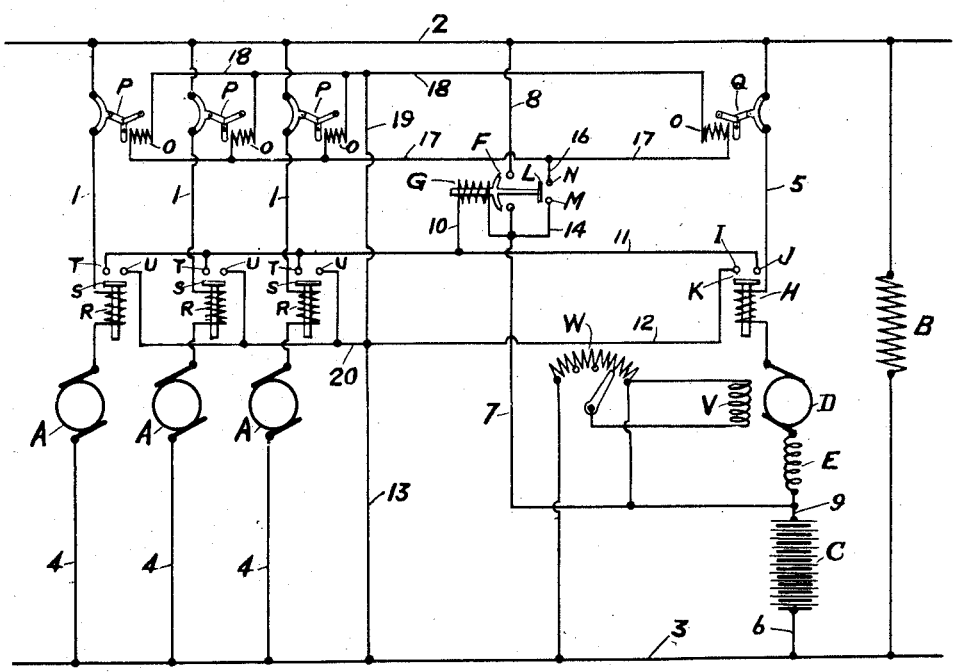
Figure 2:
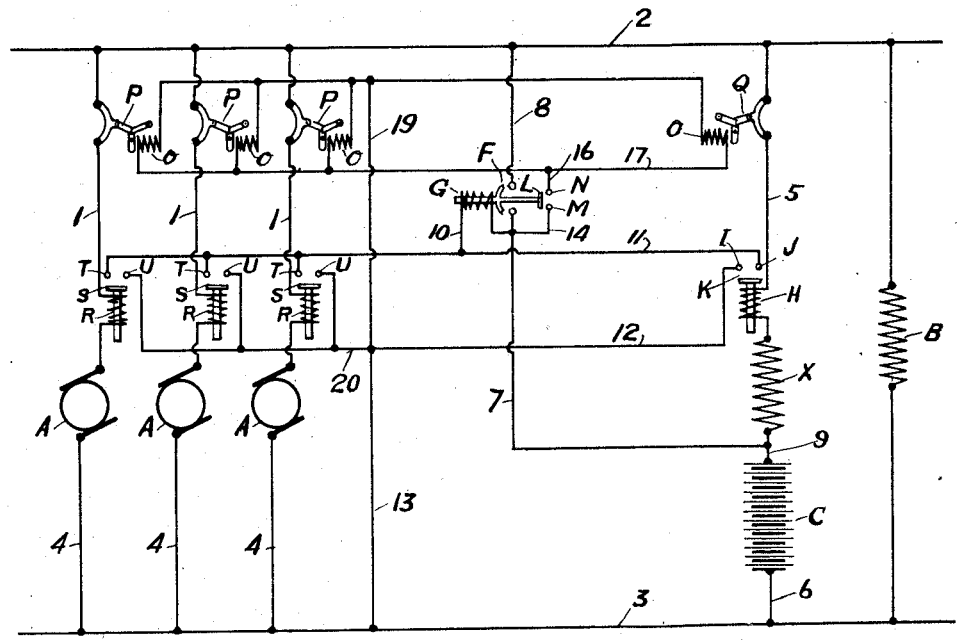

Figure 1, represents one embodiment of my invention, while Fig. 2, is a modification.

A, A, A, are exciters representing the source of fluctuating voltage supplying energy to the load B, which may be the field of a main generator, through the leads 1, the busbars 2 and 3 and the leads 4.

C is the storage battery which during normal operation is connected from one terminal, through the lead 9, the booster D, the series coil of the booster E and the lead 5 to the busbar 2, and from the other terminal through the lead 6 to the busbar 3. The series coil E of the booster D is so connected that any current flowing through it will produce a voltage in the booster D which will oppose the flow of current. If the battery C were connected directly to the busbars 2 and 3, the fluctuations in voltage on these busbars would cause a relatively large current to flow through the battery in either one direction or the other, depending on whether the bus voltage was at any instant higher or lower than the voltage of the battery. If the booster D and its series field E are properly designed and connected, as shown, a relatively small change in current through them and the battery will produce a counter electro-motive-force in the booster which added to the battery voltage will at any instant equal the voltage across the busbars and so limit the flow of current through the battery and booster to the relatively small current required to give the necessary counter electro-motive-force in the booster, this current being approximately proportioned to the change in voltage on the busbars 2 and 3. Lead 7 in the drawing is tapped to the battery lead 9 between the battery and the booster and is connected through the switch F and the lead 8 to the busbar 2. During normal operation the switch F is open. This switch is here shown as electrically operated and as capable of being closed by passing current through the closing coil G.

The overload relay H is shown inserted in the lead 5 between the booster D and the busbar 2. This relay is so designed that when the current through it exceeds a predetermined value it automatically closes a contact K between points I and J and establishes a circuit from one terminal of the battery through leads 7, closing coil G of the switch F, the leads 10 and 11 to contact J, through the relay contact K to I, leads 12 and 13, busbar 3 and lead 6 to the other terminal of the battery, thus energizing the closing coil G and closing the switch F.

Mechanically connected to and operated by the switch F is an auxiliary switch L which, when the switch F is closed makes contact across M and N and establishes a circuit so that current flows from one terminal of the battery C through 7, 14, M, L, N, 16, 17, and coils O, O, and 18, 19, 13, 3 and 6, to the other terminal of the battery. This current flowing through the coils O, O, trips the circuit breakers P, P and cuts the generators A, A, off from the busbar 2 leaving the entire load B on the storage battery C. There is also shown a trip coil for the booster circuit breaker Q which opens this breaker in the same manner as the breakers P are opened on the closing of switch F. The trip coils here shown are of the "shunt trip" type, but any other electrical or mechanical means of opening these breakers dependent on the closing of the switch F would serve as well. There are also shown overload relays R, R, in the generator circuits, any one of which, in case the current in the corresponding generator exceeds a predetermined amount, will cause the corresponding contact S to close the circuit between T and U. These latter points being in multiple with J and I, the same cycle of operation is repeated as that described when the relay H causes contact K to close the circuit between I and J, namely, the switch F is closed and the circuit breakers P and Q are opened leaving all load to be carried by battery C alone.

Under normal conditions the battery is connected to the busbars through the booster D, as shown. If now there is a fluctuation in voltage on the busbars 2 and 3, this will cause a current to flow from busbar 2 through lead 5, relay H, booster D, series coil E, lead 9, battery C and lead 6, to busbar 3, the direction of the current depending on whether the busbar voltage is higher or lower than the battery voltage and the intensity of the current will vary with the variation in busbar voltage from the normal. The booster voltage caused by this current in the coil E is such as to limit this flow of current and under normal conditions to prevent it from exceeding the setting of relay H. If, however, the fluctuation in busbar voltage is excessive, the intensity of this current will exceed the predetermined setting of the overload relay H and cause the contact K to close the circuit between I and J and current will flow from one terminal of the battery through 9, 7, G, 10, 11, J, K, I, 12, 13, 3, and 6 to the other terminal of the battery, closing the switch F and connecting the battery C directly to the busbar 2 through 7, F and 8. This connection short circuits the booster through H, 5, 2, 8, F, 7, 9 and E, but as the action of the series coil E on the booster D is such as to oppose the flow of current this will not ordinarily cause any excessive flow of current in this circuit. Furthermore the switch F in closing closes the auxiliary switch L across M and N and current will flow from one terminal of the battery through 7, 14, M, L, N, 16, 17, O, 18, 19, 13, 3, and 6 to the other terminal of the battery. This current through O will trip the circuit breakers P and Q and leave the load B on the battery C, and at the same time open the short circuit on the booster D, all as described above.

A separately excited field V is shown on the booster, which may be controlled by the rheostat W to adjust the voltage of the battery circuit to the average voltage across the exciter busbars 2 and 3.

In Fig. 2 a similar arrangement of apparatus is shown except that the booster D is replaced by a resistance X, which serves to limit the amount of charge and discharge of the battery with variations of voltage across the conductors 2—3; its function in this respect being the same as that of the booster D in Fig. 1. The resistance of X may be made sufficiently high to limit the battery current to any desired amount with a given change of voltage on the circuit 2—3. The means for cutting out this resistance and connecting the battery directly across the circuit are similar to that shown in Fig. 1.

What I claim is:

1. In combination an electric circuit and its source, a storage battery connected to the circuit, means dependent upon the battery current connected in series between the battery and the circuit for limiting said current, means for short circuiting said limiting means when the battery current exceeds a predetermined value, and automatic means for disconnecting the source from the circuit when said short circuit is closed.

2. In combination an electric circuit and its source, a storage battery connected to the circuit, means dependent upon the battery current connected in series between the battery and the circuit for limiting said current, means for short circuiting said limiting means when the battery current exceeds a predetermined value and automatic means for disconnecting the source from the circuit and opening the circuit of the limiting means when said short circuit is closed.

3. In combination, an electric circuit and its source, a storage battery connected to the circuit, means dependent upon the battery current connected in series between the battery and the circuit for limiting said current, means for short-circuiting said limiting means when the current from the source exceeds a predetermined value, and automatic means for disconnecting the source from the circuit when said short-circuit is closed.

4. In combination an electric circuit and its source, a storage battery connected to the circuit, means dependent upon the battery current connected in series between the battery and the circuit for limiting said current, means for short-circuiting said limiting means when the current from the source exceeds a predetermined value, and automatic means for disconnecting the source from the circuit and opening the circuit of the limiting means when said short-circuit is closed.

5. In combination an electric circuit and its source, a storage battery connected to the circuit, means dependent upon the battery current connected in series between the battery and the circuit for limiting said current, means for short circuiting said limiting means when either the battery current exceeds a predetermined value or the current from the source exceeds a predetermined value, and automatic means for disconnecting the source from the circuit when said short-circuit is closed.

6. In combination an electric circuit and its source, a storage battery connected to the circuit, means dependent upon the battery current connected in series between the battery and the circuit for limiting said current, means for short circuiting said limiting means when either the battery current exceeds a predetermined value or the current from the source exceeds a predetermined value, and automatic means for disconnecting the source from the circuit and opening the circuit of the limiting means when said short circuit is closed.

7. In combination an electric circuit, a plurality of generators connected thereto, a storage battery connected to the circuit, means dependent upon the battery current connected in series between the battery and the circuit for limiting said battery current, means for short-circuiting said limiting means when either the battery current exceeds a predetermined value or the current from any one of the generators exceeds a predetermined value, and automatic means for disconnecting all the generators from the circuit when the said short-circuit is closed.

8. In combination, an electric circuit, a plurality of generators connected thereto, a storage battery connected to the circuit, means dependent upon the battery current connected in series between the battery and the circuit for limiting said battery current, means for short-circuiting said limiting means when either the battery current exceeds a predetermined value or the current from any one of the generators exceeds a predetermined value, and automatic means for disconnecting all the generators from the circuit and opening the circuit of the limiting means when said short circuit is closed.

9. In combination an electric circuit and its source, a storage battery connected to the circuit, a resistance connected in series between the battery and the circuit for limiting the battery current, means for short-circuiting said resistance when the battery current exceeds a predetermined value, and automatic means for disconnecting the source from the circuit when said short-circuit is closed.

10. In combination an electric circuit and its source, a storage battery connected to the circuit, a resistance connected in series between the battery and the circuit for limiting the battery current, means for short-circuiting said resistance when the current from the source exceeds a predetermined value, and automatic means for disconnecting the source from the circuit when said short-circuit is closed.

11. In combination an electric circuit and its source, a storage battery connected to the circuit, a resistance connected in series between the battery and the circuit for limiting the battery current, means for short circuiting said resistance when either the battery current exceeds a predetermined value or the current from the source exceeds a predetermined value, and automatic means for disconnecting the source from the circuit when said short-circuit is closed.

12. In combination an electric circuit, a plurality of generators connected thereto, a storage battery connected to the circuit, a resistance connected in series between the battery and the circuit for limiting the battery current, means for short-circuiting said resistance when either the battery current exceeds a predetermined value or the current from any one of the generators exceeds a predetermined value and automatic means for disconnecting all the generators from the circuit when the said short-circuit is closed.

In testimony whereof I have hereunto signed my name.

JOSEPH H. TRACY.

Witnesses:
  J. W. ACHORD,
  T. L. HAMMERSLEY.